United States Patent
Cowan et al.

(10) Patent No.: US 9,577,397 B2
(45) Date of Patent: Feb. 21, 2017

(54) METHOD OF MANUFACTURING A SHELL ASSEMBLY FOR AN ELECTRICAL CONNECTOR

(75) Inventors: Wayne Cowan, Shenzhen (CN); Brett A. Rosenthal, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 13/878,394

(22) PCT Filed: Jul. 12, 2012

(86) PCT No.: PCT/CN2012/078560
§ 371 (c)(1),
(2), (4) Date: Apr. 8, 2013

(87) PCT Pub. No.: WO2014/008650
PCT Pub. Date: Jan. 16, 2014

(65) Prior Publication Data
US 2015/0236465 A1 Aug. 20, 2015

(30) Foreign Application Priority Data
Sep. 16, 2011 (DE) .......................... 10-2011-082-806

(51) Int. Cl.
*H01R 43/02* (2006.01)
*H01R 43/16* (2006.01)
(Continued)

(52) U.S. Cl.
CPC ................ *H01R 43/16* (2013.01); *B21D 5/00* (2013.01); *B21D 28/10* (2013.01);
(Continued)

(58) Field of Classification Search
CPC ......... B21D 28/06; B21D 28/10; B65H 45/04; B65H 45/12; H01R 24/62; H01R 43/16; H01R 43/26; H05K 5/04; Y10T 29/49105; Y10T 29/49218; Y10T 29/49798; Y10T 29/49845; Y10T 29/49002; Y10T 29/49204; Y10T 29/49208
(Continued)

(56) References Cited

U.S. PATENT DOCUMENTS 4,149,768 A * 4/1979 Wise .............................. 439/730
4,807,358 A * 2/1989 Dechelette et al. ............ 29/857
(Continued)

FOREIGN PATENT DOCUMENTS

CN      100466401 C      3/2009
CN      201663287 U      12/2010
(Continued)

OTHER PUBLICATIONS

International Search Report and Written Opinion for PCT Application No. PCT/CN2012/078560, mailed Apr. 18, 2013, 12 pages.

*Primary Examiner* — Paul D Kim
(74) *Attorney, Agent, or Firm* — Kilpatrick Townsend and Stockton, LLP

(57) ABSTRACT

Methods are provided for manufacturing a shell assembly for an electrical connector. First and second shells of a shell assembly may be formed from metal sheets via a stamping process. The stamping process may produce a number of first shells attached to a section of metal sheet remaining after the stamping process—a guide rail—with the front end opening of the first shell being oriented at 90 degrees relative to the guide rail. A second shell may be formed and severed from a metal sheet as a result of the stamping process. One end of the first shells may be exposed after the stamping process such that the second shells may be assembled over the exposed end of the first shells to form a shell assembly. Additional operations can be performed on the shell assembly.

22 Claims, 11 Drawing Sheets

(51) Int. Cl.
*B21D 5/00* (2006.01)
*B21D 28/10* (2006.01)
*B23K 26/08* (2014.01)
*H01R 13/6581* (2011.01)
*H01R 24/62* (2011.01)

(52) U.S. Cl.
CPC ...... *B23K 26/0619* (2015.10); *B23K 26/0838* (2013.01); *H01R 13/6581* (2013.01); *H01R 24/62* (2013.01); *Y10T 29/49213* (2015.01); *Y10T 29/49218* (2015.01)

(58) Field of Classification Search
USPC ......... 29/592.1, 830, 835, 844; 439/79, 567, 439/597, 607–610
See application file for complete search history.

(56) References Cited

U.S. PATENT DOCUMENTS

| | | | |
|---|---|---|---|
| 4,842,541 A * | 6/1989 | Leandris | 439/281 |
| 5,188,546 A * | 2/1993 | Ballard et al. | 439/885 |
| 5,495,669 A * | 3/1996 | Legrady et al. | 29/885 |
| 5,518,421 A | 5/1996 | Davis | |
| 5,957,739 A | 9/1999 | Bianca et al. | |
| 6,165,015 A | 12/2000 | Wu et al. | |
| 6,203,336 B1 * | 3/2001 | Nakamura | 439/80 |
| 6,224,422 B1 * | 5/2001 | Zhu et al. | 439/607.01 |
| 6,247,227 B1 | 6/2001 | Ziberna | |
| 6,634,101 B2 * | 10/2003 | Sato | 29/876 |
| 6,752,661 B2 | 6/2004 | Gu et al. | |
| 7,114,253 B2 * | 10/2006 | Murakami et al. | 29/884 |
| 7,727,019 B2 * | 6/2010 | Droesbeke et al. | 439/607.35 |
| 2006/0128172 A1 | 6/2006 | Chien et al. | |
| 2008/0072644 A1 | 3/2008 | Umeno et al. | |

FOREIGN PATENT DOCUMENTS

| | | |
|---|---|---|
| CN | 202282476 U | 6/2012 |
| EP | 1521339 A1 | 4/2005 |

* cited by examiner

METHOD OF MANUFACTURING A SHELL ASSEMBLY FOR AN ELECTRICAL CONNECTOR

CROSS REFERENCE TO RELATED APPLICATIONS

This application is the U.S. National Stage entry of PCT/CN2012/078560, filed Jul. 12, 2012, the disclosure of which is herein incorporated by reference for all purposes.

BACKGROUND OF THE INVENTION

The present invention relates generally to systems and methods for manufacturing an electrical connector, such as USB electrical connectors.

Many electronic devices mate with electrical connectors that receive and provide power and data, e.g., USB electrical connectors. These electrical connectors are often cable assemblies that are designed to mate with corresponding receptacle connectors on an electronic device. A cable assembly may include a plug connector that plugs into the receptacle connector of an electronic device, thereby forming one or more conductive paths for signals and power.

The plug connector of a USB connector often includes a shell that surrounds and provides mechanical support and/or electrical insulation for contacts, the shell having a housing assembled over a portion thereof. These housings may be on the end of a cable. A progressive stamping operation is often used to form shells for USB plug connectors from a sheet of metal. Typically, the shell is formed such that the direction of shell's opening is parallel to the length of the metal sheet and the direction in which the metal sheet is fed through the progressive stamping process. At the conclusion of the stamping process, the shell may be removed from the metal sheet and manually assembled with the other cable assembly components.

Within the electronic device market, there is an increasing demand for smaller devices and smaller corresponding accessories, e.g., USB cable assemblies. This demand for smaller electronic components is often coupled with a high-volume production requirement. To decrease the size of USB cable assemblies, the shell, among other components, may need to be reduced in size through a process that is suitable for high-volume production.

Many manufacturing systems and methods face challenges in producing reduced profile or slim USB connector shells while satisfying high-volume production requirements. Accordingly, it is desirable to provide systems and methods for the high-volume manufacture of a slim profile USB connector shell.

BRIEF SUMMARY OF THE INVENTION

Various embodiments of the invention pertain to methods of manufacturing shells for USB plug connectors. For example, the USB shell may include a front shell that is assembled over a rear shell that is smaller than the front shell such that the front shell partially overlaps the rear shell. The difference is size between the front and rear shell may allow for a housing or boot having a cable on one end to be assembled over the portion of the rear shell not overlapped by the front shell such that the outer surface of the housing and the front shell are flush or nearly flush. This connector design may be desirable because it may be aesthetically pleasing and smaller than typical USB connectors.

To manufacture this two-piece USB shell, front and rear shells may be formed from metal sheets via a stamping process that occurs in multiple stages. The stamping process may produce a number of rear shells attached to a section of metal sheet remaining after the stamping process—a carrier or guide rail—with the front end opening of the rear shell being oriented at 90 degrees relative to the guide rail. A front shell may be formed and severed from a metal sheet as a result of the stamping process. One end of the rear shell may be exposed after the stamping process such that additional operations can be performed on the rear shell while the other end of the shell remains attached to the guide rail. For example, the front shells may be assembled over the exposed end of the rear shells to form a shell assembly. The guide rail, now carrying a number of shell assemblies, may route the shell assemblies from one operation to the next, e.g., bonding operations, polishing operations, plating operations and others. This method of manufacture may reduce cycle time and increase efficiency as the guide rail may route the shell assemblies along a manufacturing line without manual intervention and without having to remove the shell assemblies from one transportation mechanism and putting them on another transportation mechanism for additional operations.

According to one embodiment, a method of manufacturing an electrical connector is provided. A plurality of first three-dimensional shells are formed along a length of a first metal strip using a progressive stamping process, each of the first shells having a generally rectangular body attached to the first metal strip by a neck and arranged along the first metal strip such that a front end opening of each first shell is orthogonal to the length of the first metal strip. A plurality of second three-dimensional shells are formed along a length of a second metal strip using a progressive stamping process, each of the second shells having a generally rectangular body attached to the second metal strip and arranged along the second metal strip such that front and rear openings of each second shell are parallel to a length of the second metal strip. For each first shell in the plurality of first shells, attaching a second shell to first shell by: (i) severing the second shell from the second metal strip, (ii) sliding the rear opening of the second shell over the front end opening of the first shell so that a portion of the second shell overlaps the first shell and (iii) and bonding the first and second shells together in the overlapping region to form a shell assembly. And for each shell assembly, performing additional operations on the shell assembly while the first shell is attached to the first metal strip by the neck.

According to another embodiment, a method of manufacturing an electrical connector is provided. A plurality of first three-dimensional shells are formed along a length of a first metal strip using a progressive stamping process, each of the first shells having a generally rectangular body attached to the first metal strip by a neck and arranged along the first metal strip such that a front end opening of each first shell is orthogonal to the length of the first metal strip. A plurality of second three-dimensional shells are formed along a length of a second metal strip using a progressive stamping process, each of the second shells having a generally rectangular body attached to the second metal strip and arranged along the second metal strip such that a front end opening of each second shell is orthogonal to a length of the second metal strip. For each first shell in the plurality of first shells, attaching a second shell to first shell by: (i) severing the second shell from the second metal strip, (ii) sliding the rear opening of the second shell over the front end opening of the first shell so that a portion of the second shell overlaps the first shell and (iii) and bonding the first and second shells together in the overlapping region to form a shell assembly. And for each shell assembly, performing additional operations on the shell assembly while the first shell is attached to the first metal strip by the neck.

Although aspects of the invention are described in relation to reduced profile or slim USB connectors, it is appreciated that these methods, features and aspects can be used in a variety of different environments, regardless of connector size or type.

The shells described herein can be used in a variety of different electrical connectors, which may use a variety of different connector technologies. The invention may apply to many commonly used data connectors including standard USB and mini USB connectors, FireWire connectors, as well as many of the proprietary connectors, e.g., Apple's proprietary 30-pin connector, used with common portable electronics. The invention may also apply to internal connectors or other connections between components within the enclosure of an electronic device.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Embodiments can provide methods for manufacturing a shell assembly. A progressive stamping operation may be used to form a plurality of two different shells from two different metal sheets or metal strips. For example, one shell may be a rear shell that is formed having an opening perpendicular to the direction of the length of the metal sheet. One end of the rear shell may be accessible such that additional operations can be performed on the rear shell while the other end of the rear shell remains attached to a section of the metal strip remaining after the stamping process—a guide rail. The other shell may be a front shell that is formed and severed from the other metal strip. The front shells may be assembled over the rear shells that remain attached to the guide rail to form a plurality of shell assemblies that all may be accessible such that additional operations can be performed on the shell assemblies as the guide rail routes the shell assemblies to different operation stations. Allowing the shell assemblies to remain on a single transportation apparatus, e.g., the guide rail, for multiple operations may obviate the need to spend additional time and resources to manually route shells between operation stations. Embodiments of these methods are described in further detail below.

I. Method of Manufacture

Figure 1:
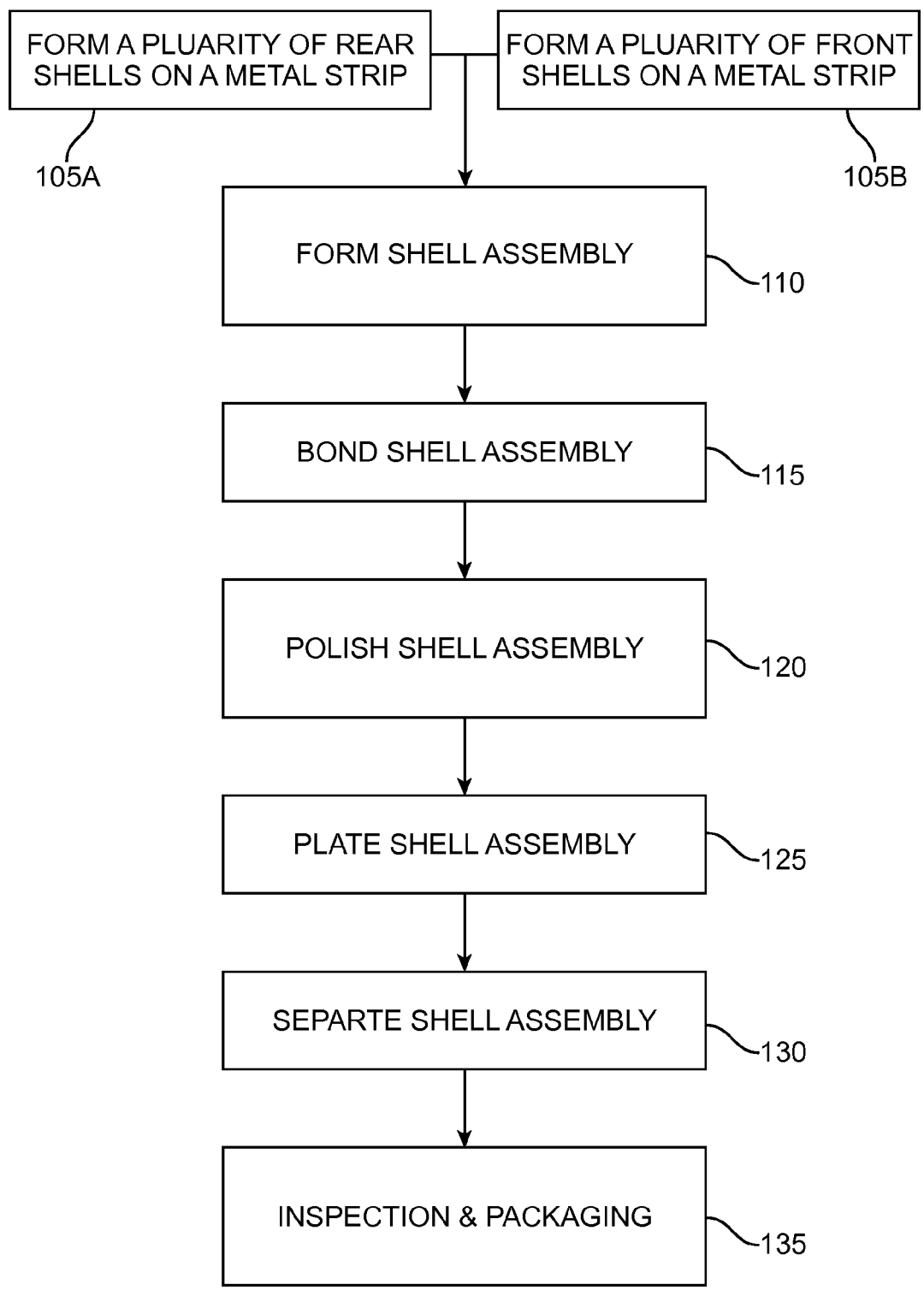
FIG. 1 illustrates a method of manufacturing a shell assembly for an electrical connector according to embodiments of the present invention.

FIG. 1 illustrates a method of manufacturing a shell assembly for an electrical connector according to embodiments of the present invention. In some embodiments, the shell assembly may be used in a USB plug connector. Each step of the method of FIG. 1 is discussed in detail below.

A. Forming

Figure 2A:
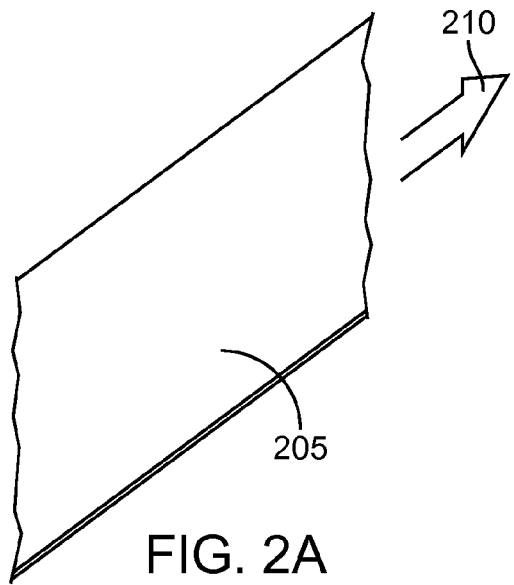
FIGS. 2A-2E illustrate a metal strip at different stages of a progressive stamping operation for forming a plurality of rear shells according to embodiments of the present invention.

The first steps of the method of FIG. 1, steps 105a and 105b, may take place concurrently or at different times. At step 105a, a plurality of rear shells are formed. For example, the plurality of rear shell may be formed by a progressive stamping operation. FIGS. 2A-2E illustrate a metal strip at different stages of a progressive stamping operation for forming a plurality of rear shells according to embodiments of the present invention. FIG. 2A shows a standard metal strip 205 that may be fed from, for example, a spool into a stamping machine to begin the progressive stamping operation—an arrow indicates a feed direction 210. Metal strip 205 may be formed from a stainless steel or other metallic material. The dimensions of metal strip 205 may be varied depending on the size and structural requirements of the shell assembly. For example, the thickness of metal strip 205 may be 0.3 millimeters or may range from between about 0.1 millimeters to about 1 millimeter, but embodiments of the invention are not limited to the use of a metal strip having a particular thickness. The width of the metal strip 205 may be 19 millimeters or may range from between about 10 millimeters to about 100 millimeters, but embodiments of the invention are not limited to the use of a metal strip having a particular width.

Figure 2B:
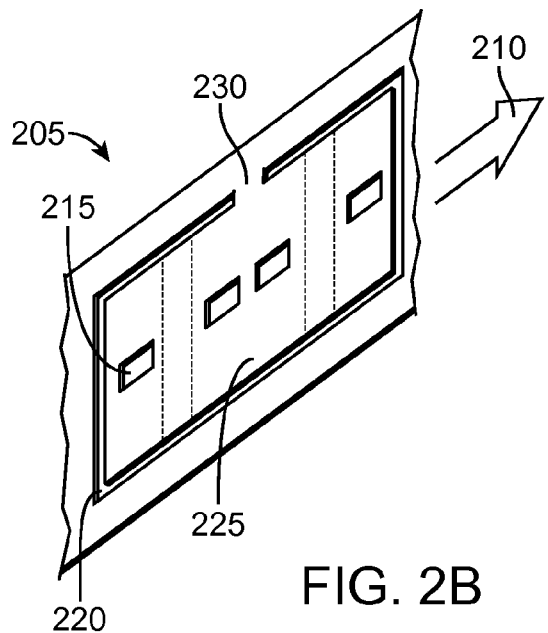

FIG. 2B illustrates metal strip 205 after the progressive stamping operation performs cutting operations according to embodiments of the present invention. Metal strip 205 may be fed from a spool or a reel into the stamping machine and positioned such that a cutting operation may be performed on a portion of metal strip 205. The cutting operation may include shearing holes 215 and shearing an outline gap 220 that defines a rectangular section 225 connected to the rest of metal strip 205 by a small metal strip or neck 230. Neck 230 may be one or more metal strips running between rectangular section 225 and the rest of metal strip 205. Rectangular section 225, as discussed below, may be formed into a shell via other operations.

In some embodiments, the number, shape and location of holes 215 may be varied based on whether the shell will be used in a USB, FireWire, DiplayPort or other connector. The shape defined by outline gap 220 may similarly vary based on the shell assembly's connector type. For example, holes 215 may include 2 holes or more than 10 holes and holes 215 may be circular, triangular or otherwise shaped. As another example, outline gap 220 may define a circle, polygon or other shape. Holes 215 and outline gap 220 may be cut out of metal strip 205 by a single step shearing operation or may occur in a multiple steps. Alternatively, shearing of some holes 215 and/or outline gap 220 may be done during this initial cutting operation while others may be sheared later in the progressive stamping operation, e.g., after the bending operations discussed below.

After the aforementioned cutting operations, the portion of metal strip 205 shown in FIG. 2B will proceed forward in feed direction 210 to the next operation. An example of the next operation is shown in the following figure.

Figure 2C:
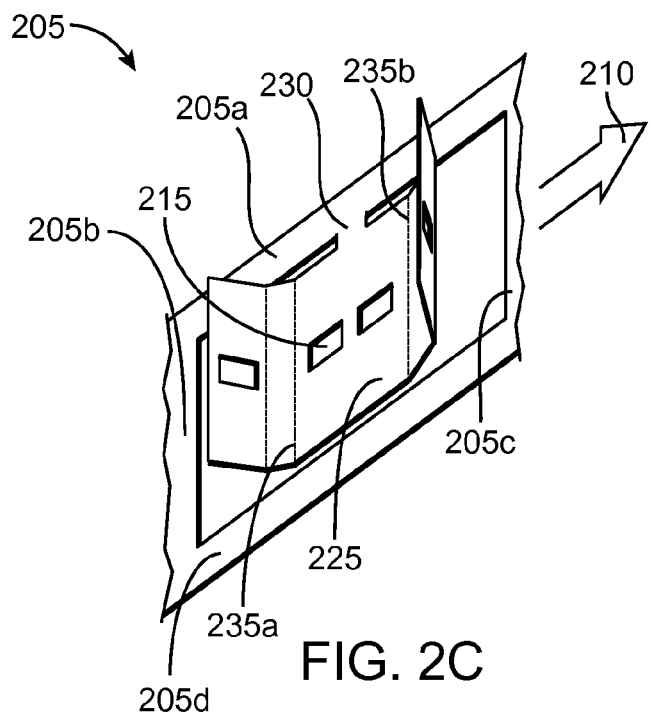

FIG. 2C illustrates metal strip 205 during a bending operation of the progressive stamping operation according to embodiments of the present invention. Following the cutting operations discussed above, strip 205 may be fed into a bending station where bending operations may be performed on rectangular section 225 of metal strip 205. For example, rectangular section 225 be bent or folded about bend lines 235a, 235b. To perform bending operations, portions of rectangular section 225 may be folded over a bend shoe by stamping. Alternatively, one or more cams may be inserted into and retracted out of the bending station during the bending operation to provide surfaces about which the rectangular section 225 may be pressed to form a shell.

In one embodiment, three cams may be applied to rectangular section 225. A first cam is applied on the bottom side of rectangular section 225 and to the left of bend line 235a. A second cam is applied to the bottom side of rectangular section 225 and the right of the bend line 235b. A third cam is applied on the top side of rectangular section 225 and to the right of a bend line 235a and to the left of bend line 325b. In this example, the third cam may hold its position while the first and second cams apply a force to the bottom side of rectangular section 225 and cause portions of rectangular section 225 to the left of bend line 235a and to the right of fold section 235b to bend about bend lines 235a and 235b, respectively. During this bending process, rectangular section 225 may appear bent as shown in FIG. 2C. Additional bending operation may be applied to rectangular section 225 to form the desired shell.

At the conclusion of the bending operations of the progressive stamping operation described above, a rear shell may be completely formed. An example is shown in the following figure.

Figure 2D:
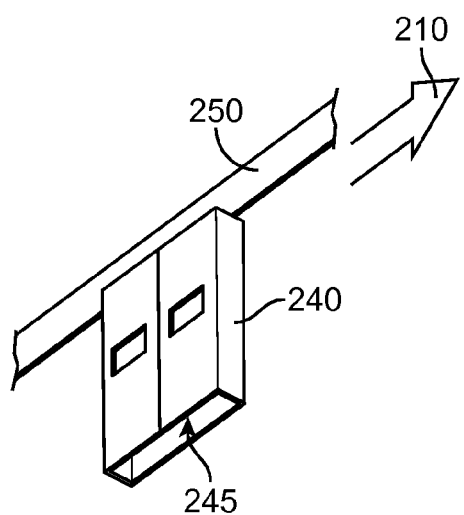

FIG. 2D illustrates a three dimensional rear shell formed through the progressive stamping operation discussed above according to embodiments of the present invention. Following the bending operations discussed above, metal strip 205 may now include a generally rectangular shell 240 that remains connected to other sections of metal strip 205 by neck 230 (not shown in FIG. 2D). As shown in FIG. 2D, portions of metal strip 205 surrounding rear shell 240 that remain after the stamping and bending operation discussed above may be removed. For example, additional stamping operations may be applied to metal strip 205 to remove some portions of metal strip 205 surrounding rear shell 240, e.g., portions 205b-d (shown in FIG. 2C), while leaving portion 205a (shown in FIG. 2C) connected to rear shell 240 by neck 230. After these stamping operations, portion 205a may now serve as a carrier or guide rail 250, which will be discussed in detail below.

FIG. 2D shows rear shell 240 having a front end opening 245 that is orthogonal to the length of the remaining portion metal strip 205—guide rail 250—and feed direction 210. The orientation of shell 240 and the removal of some residual material, as discussed above, leaves front end opening 245 unobstructed by portions of metal strip 205 and leaves shell 240 accessible by other operations as discussed below. That is, the progressive stamping process described above may produce a rear shell 240 connected to a guide rail 250 that may route rear shell 240 to other operation stations where additional operations may be performed on rear shell 240 while still connected to guide rail 240. The methods for routing guide rail 240 to additional operation stations as well as details regarding the additional operations are discussed in detail below.

In embodiments of the present invention, a plurality of rear shells 240 may be formed concurrently on a length of metal strip 205. For example, the various operations described above may be simultaneously performed on different portions of metal strip 205. As the metal strip is fed in feed direction 210, portions of metal strip 205 may be formed into rear shells 240 that are connected a continuous guide rail 250 by their respective necks 230. An example is shown in the following figure.

Figure 2E:
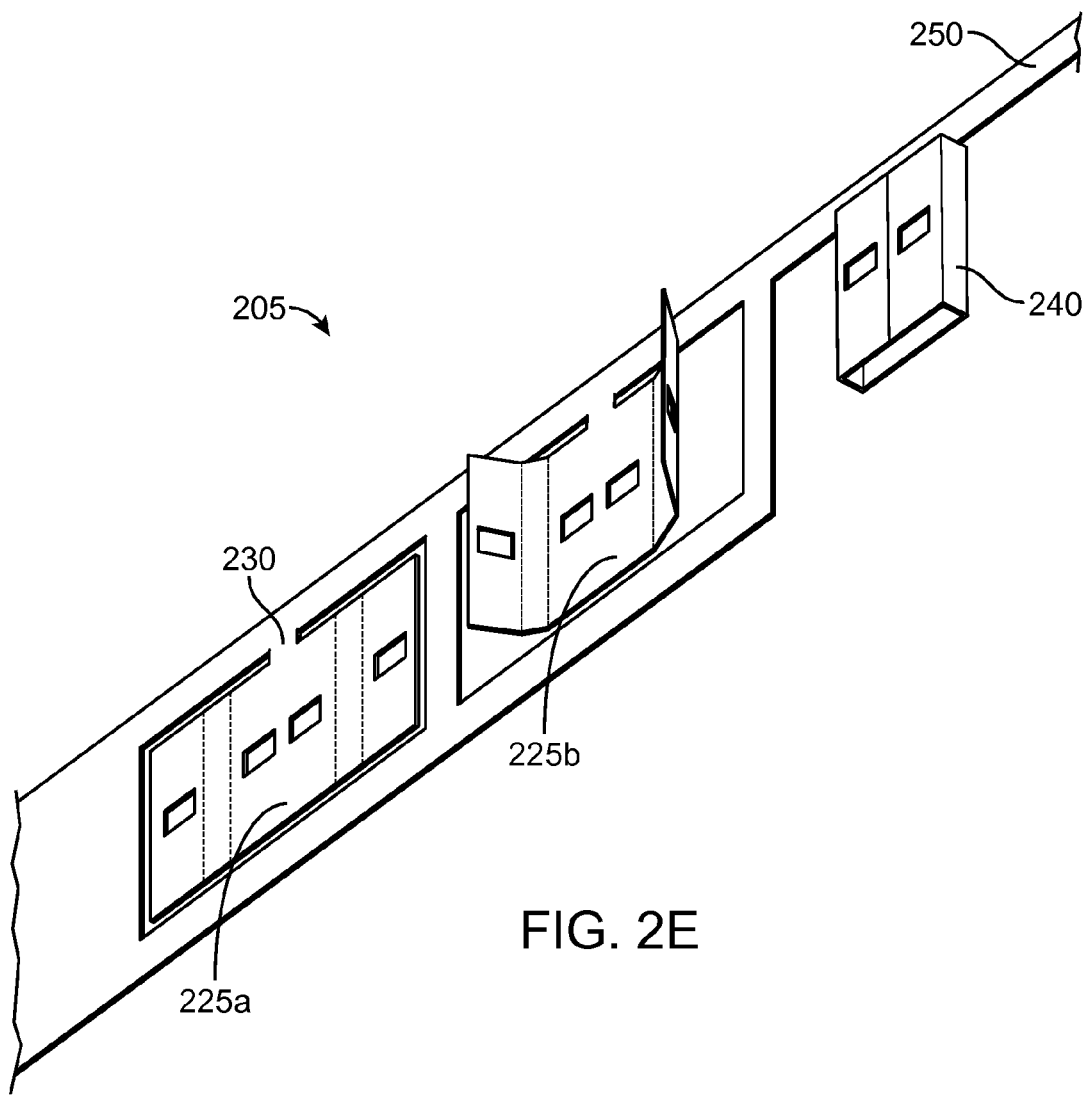

FIG. 2E illustrates multiple stages of a progressive stamping operation for forming a plurality of rear shells on a single metal strip according to embodiments of the present invention. As shown in FIG. 2E, different portions of metal strip 205 are at different stages of the progressive stamping operation. Each portion of metal strip 205 may have different operations performed thereon simultaneously resulting in a flat rectangular section 225a, a partially bent rectangular section 225b and a formed rear shall 240 at different portions of metal strip 205. Accordingly, the progressive stamping operation described herein may form a plurality of rear shells 240 from a single section of metal strip 205, each rear shell being separated in space but still connected to a common and continuous guide rail 250 via respective necks 230.

For example, each of the stamping and bending operations described above may include ten or more separate operations that may be performed simultaneously. Portions of metal strip 205 may have discrete stamping or bending operation performed thereon, and then metal strip 205 may be moved forward by one position—to the next operation station—and all the stamping and bending operations may be simultaneously performed again on respective portions of metal strip 205. This process may be until each portion of metal strip 205 is formed into rear shell 240 that remains attached to guide rail 250.

As discussed above, rear shells 240 may be generally rectangular and have a length, width and height dimension. The orientation of each of the plurality of rear shells 240 may be formed such that the length dimension of rear shell 240 is perpendicular to feed direction 210, as shown in FIGS. 2A-E. This may allow for a plurality of rear shells 240 to be routed via guide rail 250 to additional operations without having to manually handle each rear shells and then perform operations on individual rear shell 240 or having to weld rear shell 240 to a carrier in different orientations for different operations to be performed on rear shell 240. Accordingly, the progressive stamping operation described herein may be used as part of a repeatable and efficient manufacturing process.

In some embodiments, datum holes may be cut into guide rail 250 during the cutting operations described above and may be used by various routing mechanisms described below to move guide rail 250 through the manufacturing process describe herein. In some embodiments, these datum holes may have a circular shape with a diameter of 1.5 millimeters or the diameter may range from between about 0.5 millimeters to about 3 millimeters, but embodiments of the invention are not limited to the use of datum holes having a particular diameter. Datum holes may also be used to align rear shells 240 for the performance of different operations. For example, an operation station may include positioning pins that engage datum holes. The datum holes may be formed at a fixed distance from the neck 230 such that by aligning the position pins engaged with datum holes on a guide rail 250, the rear shell 240 may be moved to the appropriate location for performing an operation.

In other embodiments of the present invention, the operations described above may be performed in various orders or sequences. For example, the order of the cutting operations and bending operations may be switched and/or divided into multiple cutting and bending operations that are performed in various orders.

At the conclusion of step 105a (shown in FIG. 1), the plurality of rear shells 240 connected to guide rail 250 may be reeled onto a reel (not shown in FIGS. 2A-2E) for storage or directly routed to another operation station via a reel or other routing mechanism.

As mentioned above, step 105a may occur simultaneous with step 105b or at a different time than when step 105b is performed. In some embodiments, steps 105a and 105b may occur at the same time for reasons that will be discussed below with reference to step 110.

Figure 3A:
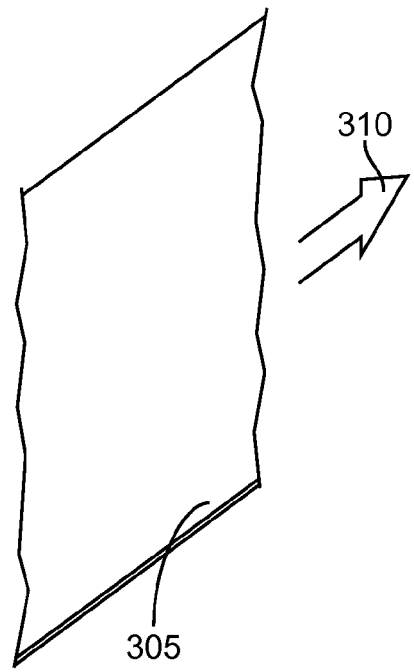
FIGS. 3A-3E illustrate a metal strip at different stages of a progressive stamping operation for forming a plurality of front shells according to embodiments of the present invention.

At step 105b of FIG. 1, a plurality of front shells are formed. For example, a plurality of front shells may be formed by a progressive stamping operation. Although the process of forming of front shell may shave many similarities with the process of forming a rear shell as described above, there may be some differences in how the front shell is formed. FIGS. 3A-3E illustrate a metal strip at different stages of a progressive stamping operation for forming a plurality of front shells according to embodiments of the present invention. FIG. 3A shows a standard metal strip 305 that may be fed from, for example, a spool into a stamping machine to begin the progressive stamping operation—an arrow indicates a feed direction 310. Metal strip 305 may be formed from the same material that metal strip 205 (not shown in FIG. 3A) may be formed from, e.g., a stainless steel or other metallic material. The dimensions of metal strip 305 may be varied depending on the size and structural requirements of the shell assembly. For example, the thickness of metal strip 305 may be 0.3 millimeters or may range from between about 0.1 millimeters to about 1 millimeter, but embodiments of the invention are not limited to the use of a metal strip having a particular thickness. The width of the metal strip 305 may be greater than the width of strip 205 (not shown in FIG. 3A), e.g., 40.5 millimeters or may range from between about 10 millimeters to about 100 millimeters, but embodiments of the invention are not limited to the use of a metal strip having a particular width.

Figure 3B:
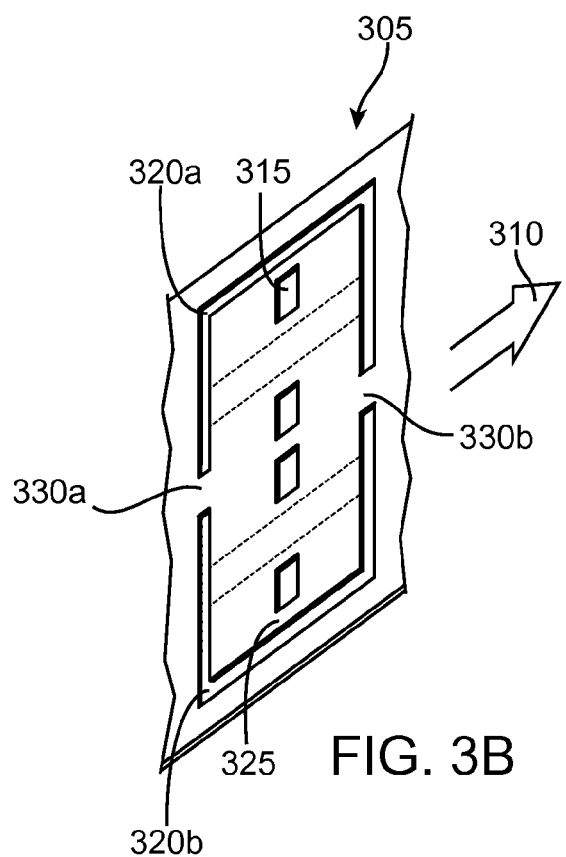

FIG. 3B illustrates metal strip 305 after the progressive stamping operation performs cutting operations according to embodiments of the present invention. Metal strip 305 may be fed from a spool or a reel into the stamping machine and positioned such that a cutting operation may be performed on a portion of metal strip 305. The cutting operation may include shearing holes 315 and shearing outline gaps 320a and 320b that define a rectangular section 325 connected to the rest of metal strip 305 by small metal strips or necks 330a and 330b. Necks 330a and 330b each may be one or more metal strips running between rectangular section 325 and the rest of metal strip 305. Although two necks—necks 330a and 330b—are shown in FIG. 3B, some embodiments may include only one neck, e.g., neck 330a. Rectangular section 325, as discussed below, may be formed into a shell via other operations.

In some embodiments, the number, shape and location of holes 315 may be varied based on whether the shell will be used in a USB, FireWire, DiplayPort or other connector. The shape defined by outline gaps 320a and 320b may similarly vary based on the type of connector the shell will be used in. For example, holes 315 may include 2 holes or more than 10 holes and holes 315 may be circular, triangular or otherwise shaped. As another example, outline gap 320a and 320b may define a circle, polygon or other shape. Holes 315 and outline gaps 320a and 320b may be cut out of metal strip 305 by a single step shearing operation or may occur in a multiple steps. Alternatively, shearing of some holes 315 and/or outline gaps 320a and 320b may be done during this initial cutting operation while others may be sheared later in the progressive stamping operation, e.g., after the bending operations discussed below.

After the aforementioned cutting operations, the portion of metal strip 305 shown in FIG. 3B will proceed forward in feed direction 310 to the next operation. An example of the next operation is shown in the following figure.

Figure 3C:
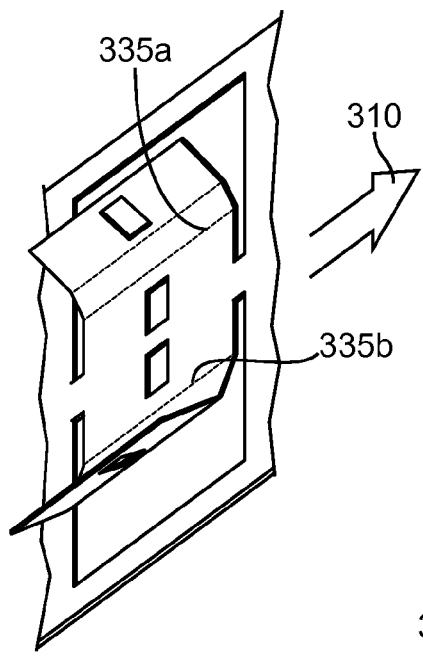

FIG. 3C illustrates metal strip 305 during a bending operation of the progressive stamping operation according to embodiments of the present invention. Following the cutting operations discussed above, strip 305 may be fed into a bending station where bending operations may be performed on rectangular section 325 of metal strip 305. For example, rectangular section 335 may be bent or folded about bend lines 335a and 335b. To perform these bending operations, portions of rectangular section 335 may be folded over a bend shoe by stamping. Alternatively, one or more cams may be inserted into and retracted out of the bending station during the bending operation to provide surfaces about which the rectangular section 335 may be pressed to form a shell, e.g., a front shell.

In one embodiment, three cams may be applied to rectangular section 325. A first cam is applied on the bottom side of rectangular section 335 and to the left of bend line 335a with respect to feed direction 310. A second cam is applied to the bottom side of rectangular section 325 and to the right of the bend line 335b with respect to feed direction 310. A third cam is applied on the top side of rectangular section 325 and between bend line 335a and 335b. In this example, the third cam may hold its position while the first and second cams apply a force to the bottom side of rectangular section 325 and cause portions of rectangular section 325 to bend about bend lines 335a and 335b as shown in FIG. 3C. Additional bending operations may be applied to rectangular section 325 to form the desired shell.

At the conclusion of the bending operations of the progressive stamping operation described above, a front shell may be completely formed. An example is shown in the following figure.

Figure 3D:
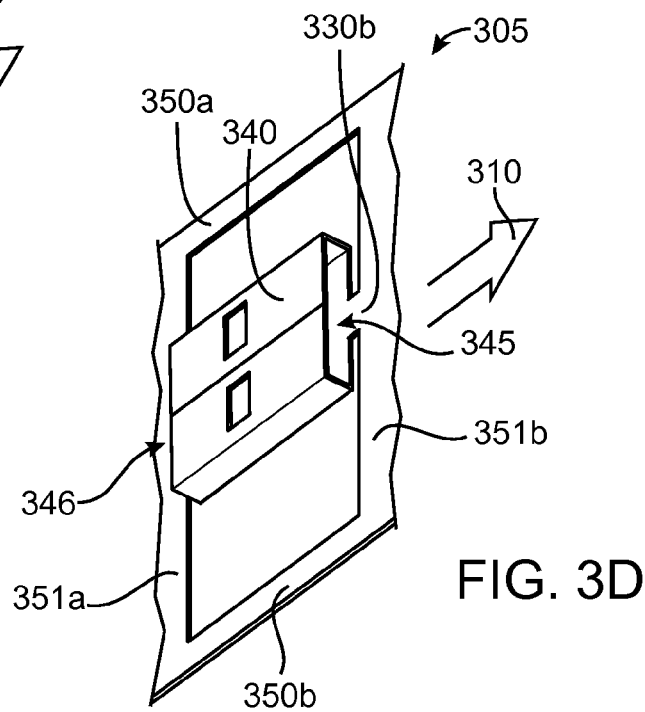

FIG. 3D illustrates a three dimensional front shell formed through the progressive stamping operation discussed above according to embodiments of the present invention. Following the bending operations discussed above, metal strip 305 may include a generally rectangular shell 340 that remains connected to other sections of metal strip 305 by necks 330a (not shown in FIG. 3D) and 330b. As shown in FIG. 3D, portions of metal strip 305 surrounding front shell 340 that remain after the stamping and bending operation may include carriers or guide rails 350a and 350b as well as support rails 351a and 351b that may not be removed during the progressive stamping operation.

FIG. 3D shows front shell 340 having a front end opening 345 and a rear end opening 346 that are parallel to the length of metal strip 305, guide rails 350a, 350b and feed direction 310. The orientation of front shell 340 shown in FIG. 3D may be the typical orientation of connectors and shells formed through a progressive stamping operation. Accordingly, the progressive stamping process described above may produce a front shell 340 connected to guide rails 350a and 350b that may route front shell 340 to other operation stations where additional operations may be performed on front shell 340 while still connected to guide rails 350a and 350b. For example, front shell 340 may be severed from guide rails 350a, 350b and supports rails 351a, 351b such that front shell 340 may be assembled over a corresponding rear shell, e.g., rear shell 240 (not shown in FIG. 3D). The methods for routing guide rail 340 to additional operation stations as well details regarding the additional operations are discussed in detail below.

In embodiments of the present invention, a plurality of front shells 340 may be formed concurrently on a length of metal strip 305. For example, the various operations described above may be simultaneously performed on different portions of metal strip 305. As the metal strip is fed in feed direction 310, portions of metal strip 305 may be formed into front shells 340 that are connected to continuous guide rails 350a, 350b by supports rails 351a, 351b and necks 330a, 330b. An example is shown in the following figure.

Figure 3E:
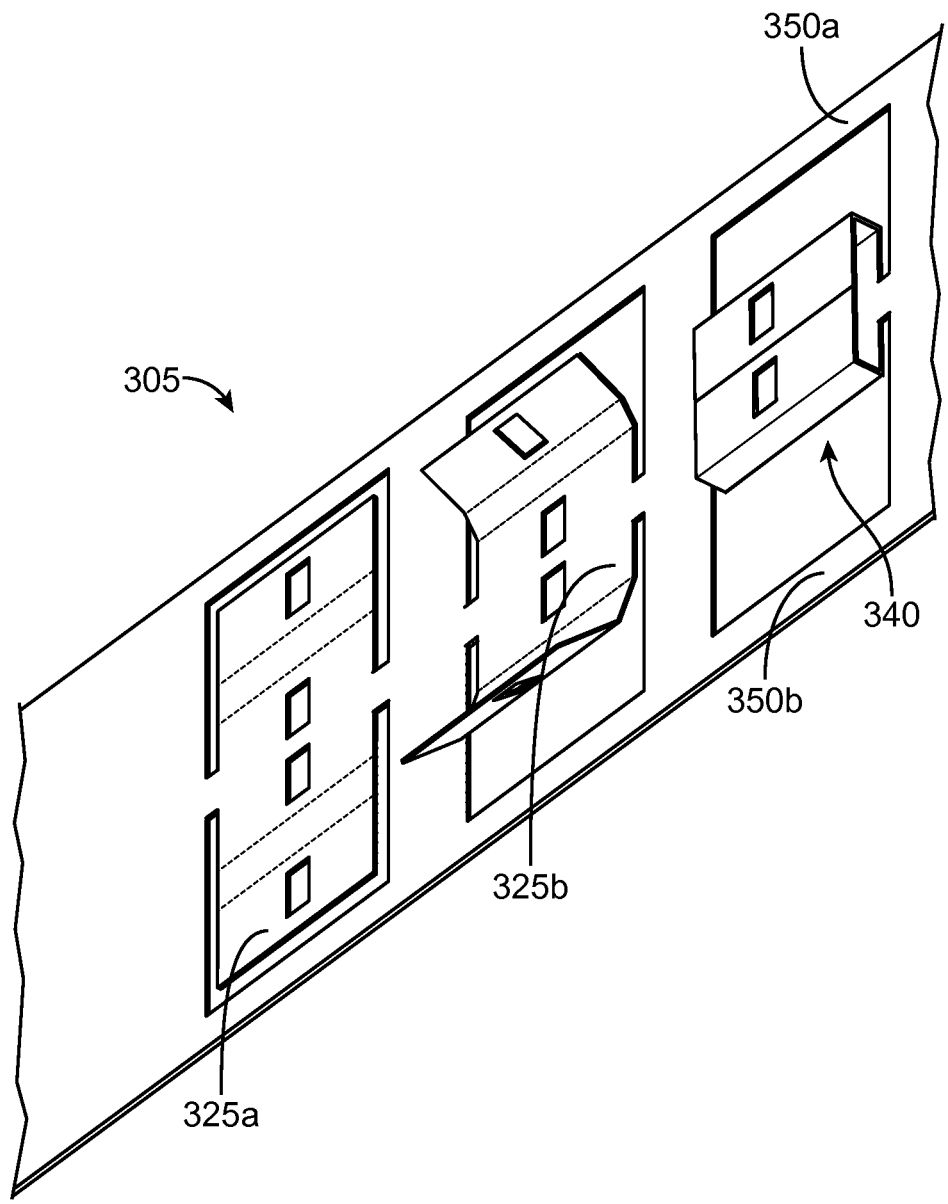

FIG. 3E illustrates multiple stages of a progressive stamping operation for forming a plurality of front shells on a single metal strip according to embodiments of the present invention. As shown in FIG. 3E, different portions of metal strip 305 are at different stages of the progressive stamping operation. Each portion of metal strip 305 may have different operations simultaneously performed thereon resulting in a flat rectangular section 325a, a partially bent rectangular section 325b and a formed rear shall 340 at different portions of metal strip 305. Accordingly, the progressive stamping operation described herein may form a plurality of front shells 340 from a single section of metal strip 305, each front shell being separated in space, but still connected to common and continuous guide rails 350a, 350b via respective necks.

In some embodiments, datum holes may be cut into one or both guide rails 350a, 350b during the cutting operations described above and may be used by various routing mechanisms described below to move front shells 340. The datum holes may also be used to align rear shells 340 for the performance of different operations, e.g., a cutting operation to sever fronts shells from metal strip 305. For example, an operation station may include positioning pins that engage datum holes. The datum holes may be formed at fixed distance from the necks 330a and 330b such that by aligning the position pins engaged with datum holes on guide rails 350a and 350b, the front shell 340 may be moved to the appropriate location for performing an operation.

In other embodiments of the present invention, the operations described above with regards to FIGS. 3A-3E may be performed in various orders or sequences. For example, the order of the cutting operations and bending operations may be switched and/or divided into multiple cutting and bending operations that are performed in various orders.

As discussed above, front shells 340 may be generally rectangular and have a length, width and height dimension. The orientation of each of the plurality of front shells 340 may be formed such that the length dimension of front shell 340 is parallel to feed direction 310. At the conclusion of step 105b (shown in FIG. 1), the plurality of front shells 340 connected to guide rails 350a, 350b may be reeled onto a reel (not shown in FIGS. 3A-3E) for storage or directly routed to another operation station via a reel or other routing mechanism. An example is shown in the figure below.

Figure 4:
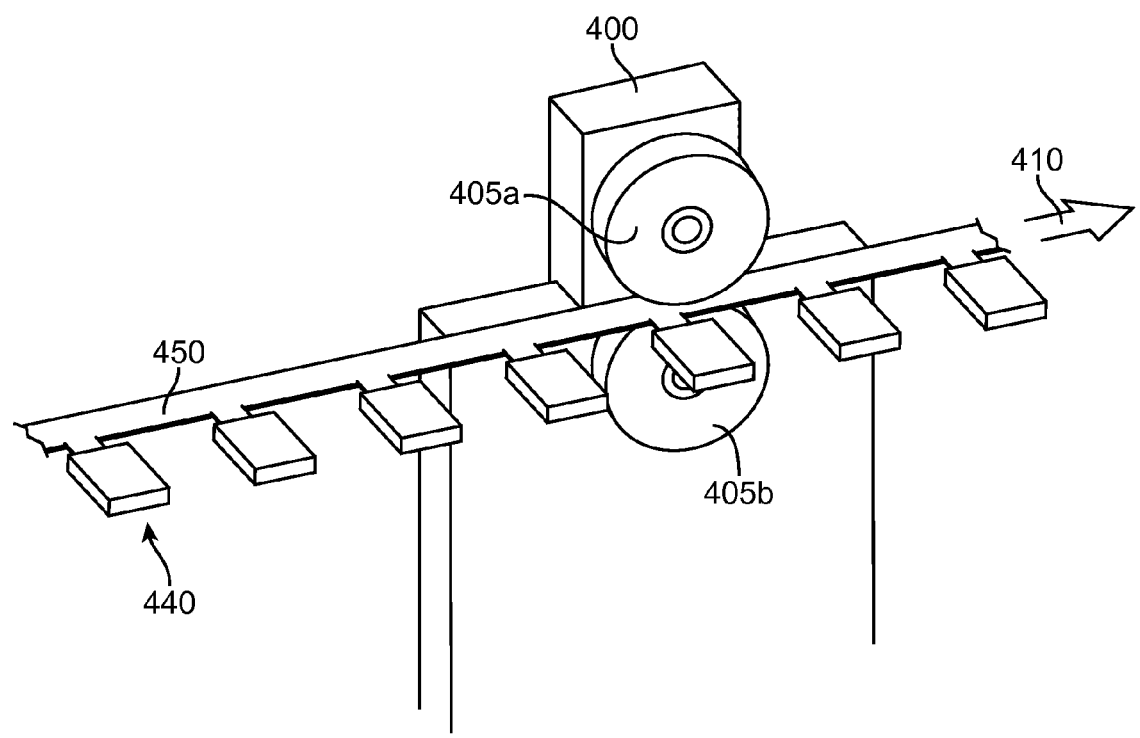
FIG. 4 illustrates a mechanism for routing shells between various operations.

FIG. 4 illustrates a mechanism for routing shells between various operations. For example, at the conclusion of step 105a, a plurality of rear shells 440 may be are routed via guide rail 450 to a guiding fixture 400. Guide rail 450 may be fed into guiding structure 400 that includes wheels 405a and 405b that engage and push guide rail 450 in direction 410. Wheels 405a and 405b may include positions pins as described above for interfacing with embodiments of guide rail 450 that include datum holes. The plurality of rear shells 440 may be fed into feed direction 410 such that the method outlined in FIG. 1 may proceed to a next step. An example of a next step is discussed in the next section.

B. Assembling

Figure 5A:
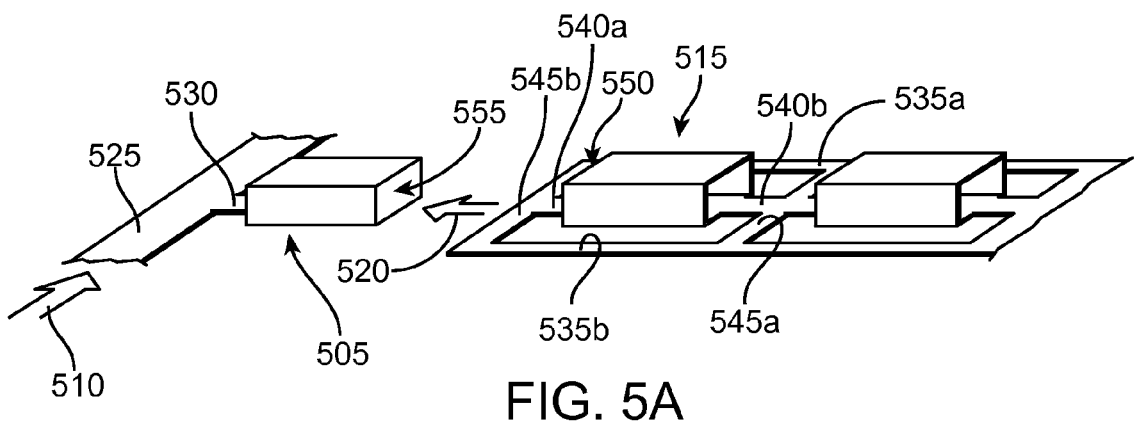
FIGS. 5A-5C illustrate different stages of forming a shell assembly according to embodiments of the present invention.
Figure 5B:
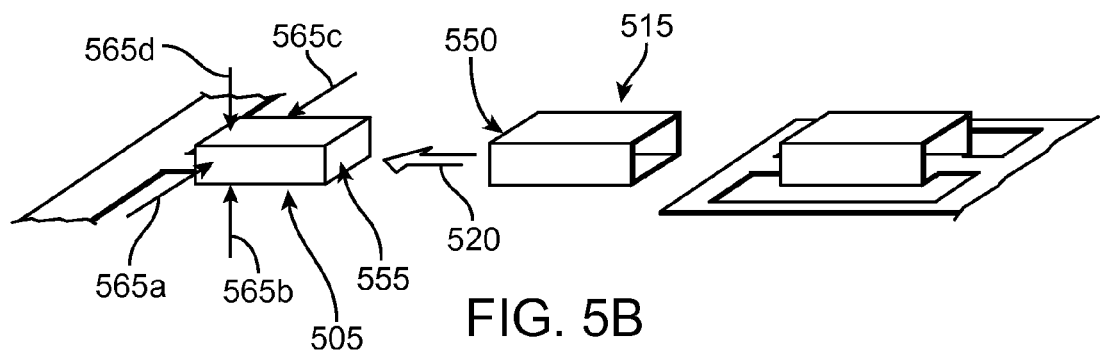
Figure 5C:
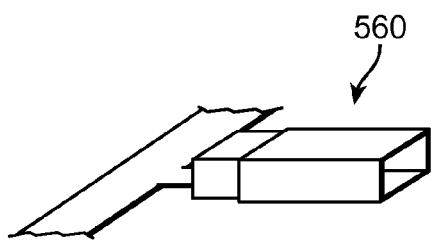

The next step after steps 105a and 105b is step 110. At step 110 of FIG. 1, a plurality of shell assemblies may be formed. For example, the plurality of front shells may be assembled over a plurality of rear shells to form shell assemblies in an assembly operation. FIGS. 5A-5C illustrate different stages of forming a shell assembly according to embodiments of the present invention. FIG. 5A shows a rear shell 505 that has been fed in feed direction 510 into position to be assembled with front shell 515 which has been moved into position according to feed direction 520. Rear shell 505 may be attached to guide rail 525 via neck 530, guide rail 525 may be connected to a plurality of rear shells 505. Front shell 515 may be attached to guide rails 535a, 535b via necks 540a, 540b which may be attached to support rails 545a and 545b, respectively. However, in order to assemble rear end opening 550 of front shell 515 over front end opening 555 of rear shell 505, front shell 515 must be severed from guide rails 535a, 535b and necks 540a, 540b and support rails 545a and 545b. An example is shown in the following figure.

FIG. 5B shows a front shell 515 severed from guide rails 535a, 535b and necks 540a, 540b and support rails 545a and 545b. The severing of front shell 515 may be accomplished by a stamping operation, e.g., cutting. Then, the rear end opening 550 of front shell 515 may be assembled in feed direction 520 over front end opening 555 of rear shell 505. For example, a robotic arm may grip the exterior surface of front shell 515 and slide front shell 515 over rear shell 505 such that front shell 515 partially overlaps the rear shell 505 such that shell assembly 560 is formed as shown in FIG. 5C.

As shown in FIGS. 5A-5C, it may not be necessary to remove rear shell 505 from guide rail 525 to form shell assembly 560. Accordingly, this would allow the shell assembly to be routed via guide rail 525 without manual intervention or having to attach the shell assembly to another guide rail to different operation stations. In some embodiments, this assembly step may also be done manually, but an automated assembly may be useful in some situations.

In some embodiments, it may be necessary or helpful to clamp or compress rear shell 505 prior to assembling front shell 515 over rear shell 505. For example, there may be some interference between the rear shell 505 and front shell 515 during the assembling process, which may require clamping forces to be applied to four sides of rear shell 505 to allow front shell 515 to be assembled over rear shell 505. For example, a clamp may be applied to rear shell 505 to apply forces to rear shell 505 in directions 565*a-d*. Clamping may further prevent stresses from being applied to neck 530 during the assembly process as the clamp would absorb forces applied by front shell 515 to rear shell 505, which may have otherwise been translated to neck 530.

In other embodiments, multiple rear shells 505 and front shells 515 may be simultaneously assembled (e.g., two or three or more) to speed up the process for line balancing with later steps that are occur more quickly. For example, bonding operations may be able to process several parts quickly and simultaneously. Thus, if shell assemblies 560 are assembled one at a time, it may not be possible to produce shell assemblies 560 such that the bonding station can run at full capacity. Underutilized resources can result in lost time and money. Accordingly, simultaneously forming shell assemblies 560 connected to a common guide rail 530 may be useful in some situations.

In yet additional embodiments, front shells may be formed by a process not described herein. However, these front shells may be assembled with rear shells formed according to embodiments of the present invention. For example, front shells formed at another location may be arranged or put on a line such that a robotic arm can access these front shells and assemble them over rear shell 505 as described above.

The plurality of shell assemblies formed as described above may be fed, e.g., by a guiding fixture, in feed direction 510 to another operation station such that the method outlined in FIG. 1 may proceed from step 110 to a next step. An example of a next step is discussed in the next section.

C. Bonding

Figure 6:
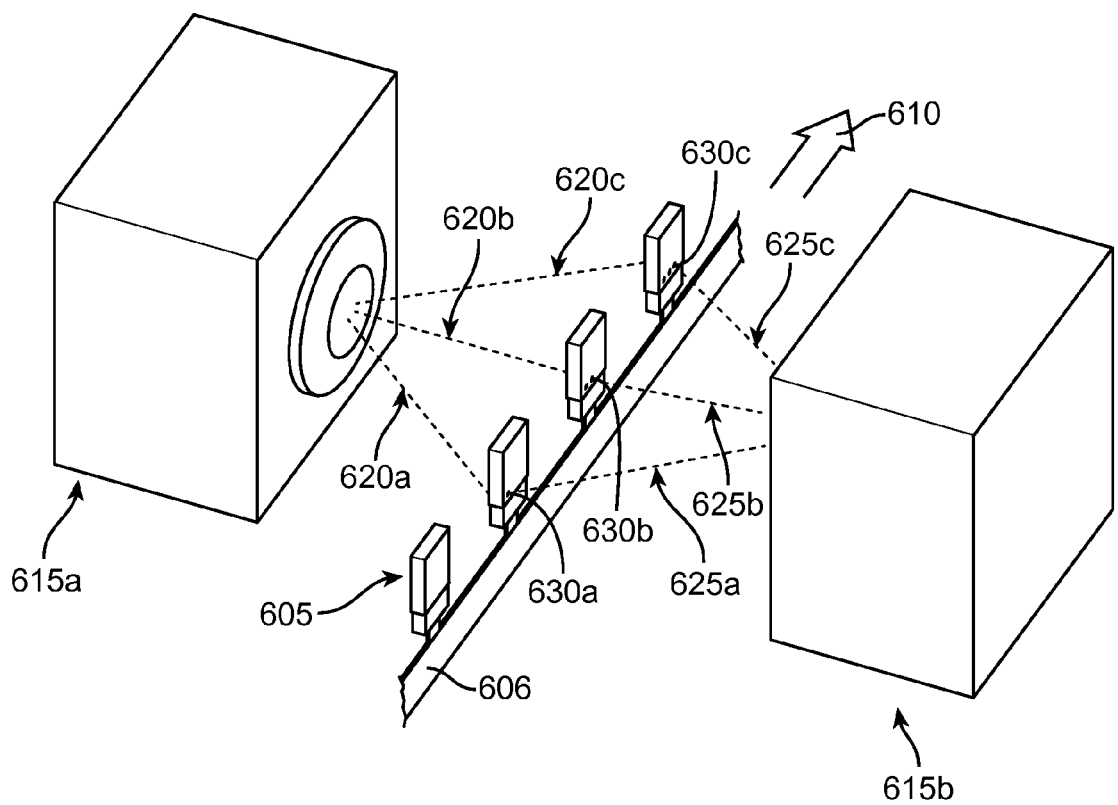
FIG. 6 illustrates a laser welding operation performed on a shell assembly according to embodiments of the present invention.

The next step after step 110 is step 115. At step 115 of FIG. 1, a plurality of shell assemblies may be bonded. For example, the front and rear shells of a plurality of shell assemblies may be bonded together in a bonding operation. FIG. 6 illustrates a laser welding operation performed on a shell assembly according to embodiments of the present invention. FIG. 6 shows shell assemblies 605 being routed into a bonding station via guide rail 606 in feed direction 610. The bonding station may include laser units 615*a* and 620*a* that each project three laser beams 620*a-c* and 625*a-c*, respectively, onto portions of shell assemblies 605 where the rear shells and front shells overlap as the shell assemblies pass through the bonding station. For example, when shell assemblies 605 are in a first position, laser beams 620*a* and 625*a* may perform a laser welding operations on front and back sides, respectively, of shell assemblies 605 to create laser welds 630*a*. Similarly, when shell assemblies 605 are in a second position, laser beams 620*b* and 625*b* may perform a laser welding operations on front and back sides, respectively, of shell assemblies 605 to create laser welds 630*b*. And when shell assemblies 605 are in a third position, laser beams 620*c* and 625*c* may perform a laser welding operations on front and back sides, respectively, of shell assemblies 605 to create laser welds 630*c*. Laser welds 630*a-c* on both sides of shells assemblies may serve to hold shell assembles 605 together.

In some embodiments, more or less than three laser welds may be applied to each side of a shell assembly 605. For example, four welds or more may be applied to both sides of the assembled connector for strength additional strength. Multiple laser welds may be applied to each side of shell assembly 605 concurrently or in series as shown in FIG. 6. The laser pulse energy of laser units 615*a* and 615*b* may be between 10 joules and 100 joules.

In other embodiments, mechanical crimping, hot bar soldering, stir friction welding, metal bonding compounds, or interlocking features may be used to hold shell assemblies together. Additionally, in some cases, it may be useful to apply a clamping force to the shell assembly to press the overlapping sections of the front and rear shell together during the bonding process.

Inspections may occur after this step 115 as well as after the proceeding and preceding steps of the method of FIG. 1. This inspection may be optical or dimensional and non-compliant parts, not meeting optical or tolerance standards, may be removed from the plurality of shell assemblies connected to a guide rail.

Following the bonding operation described above, the plurality of shell assemblies may be fed, e.g., by a guiding fixture, in feed direction 610 to another operation station such that the method outlined in FIG. 1 may proceed from step 115 to a next step. An example of a next step is discussed in the next section.

D. Polishing

Figure 7:
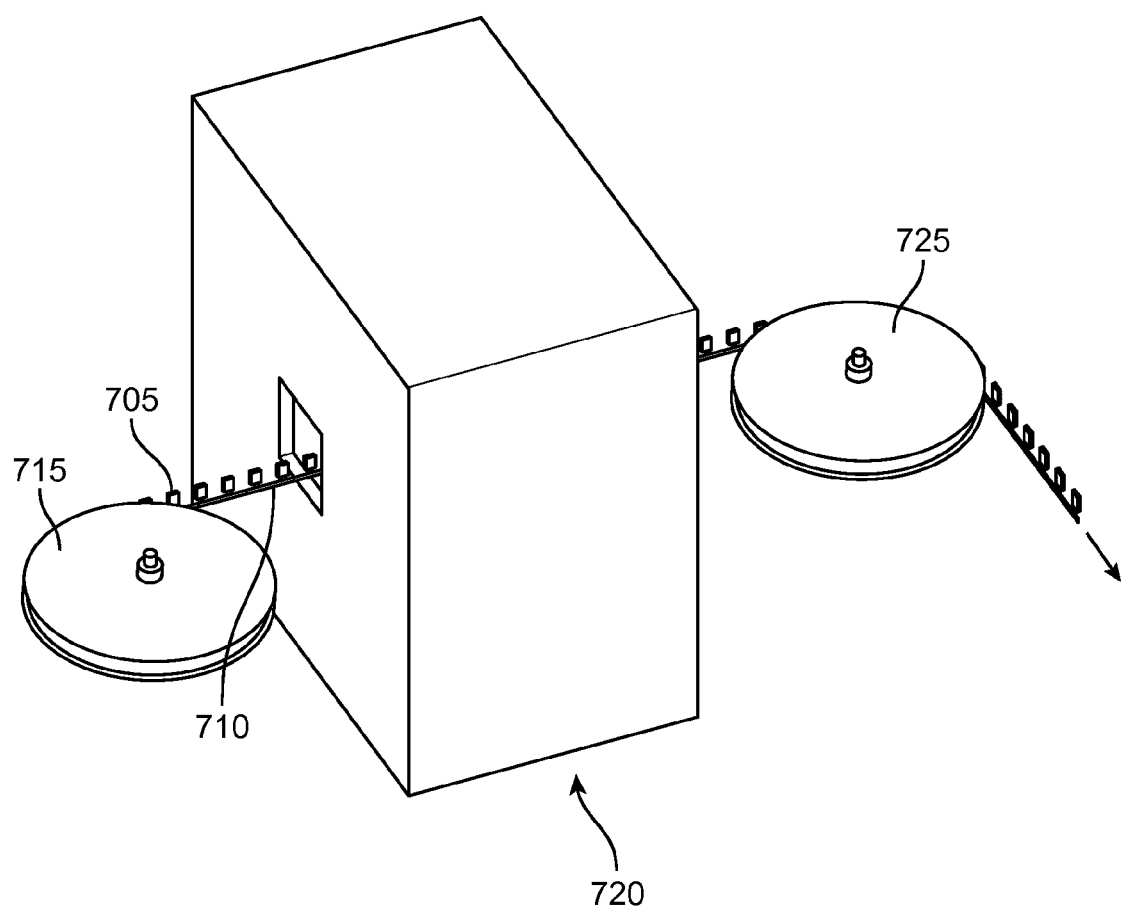
FIG. 7 illustrates a polishing operation performed on a shell assembly according to embodiments of the present invention.

The next step after step 115 is step 120. At step 120 of FIG. 1, a plurality of shell assemblies may be polished. For example, a plurality of shell assemblies may be sandblasted. FIG. 7 illustrates a polishing operation performed on a shell assembly according to embodiments of the present invention. As shown in FIG. 7, a plurality of shell assemblies 705 may be routed via guide rail 710 that is unreeled from or routed about feed reel 715 into polishing station 720, which may perform a sandblasting operation in some embodiments. For example, sandblasters contained in polishing station 720 may project sand on shell assembling 705 with, e.g., 0.3 megapascals of pressure. The pluralities of shell assemblies 705 may be continuously moving as they proceed into, through and out of the polishing station 720. After shell assemblies 705 exit polishing station 720, they may be reeled up by or routed around receiving reel 725. This type of operation may be called a reel-to-reel operation which is an operation where parts, e.g., shell assemblies 706, are unreeled at one reel and reeled up at another reel as part of an operation.

In some embodiments, one or more masks may be used to protection portion of shell assemblies 705 during the polishing process. For example, a plastic insert may be inserted into an opening of shell assemblies 705 or may be applied over the surface of sections of the shell assemblies 705. The portions of shell assemblies 705 covered by the plastic insert may not be subjected to the polishing operation, e.g., sandblasting.

Following the polishing operation described above, the plurality of shell assemblies may be fed in feed direction 730 to another operation station such that the method outlined in FIG. 1 may proceed from step 120 to a next step. An example of a next step is discussed in the next section.

E. Plating

Figure 8:
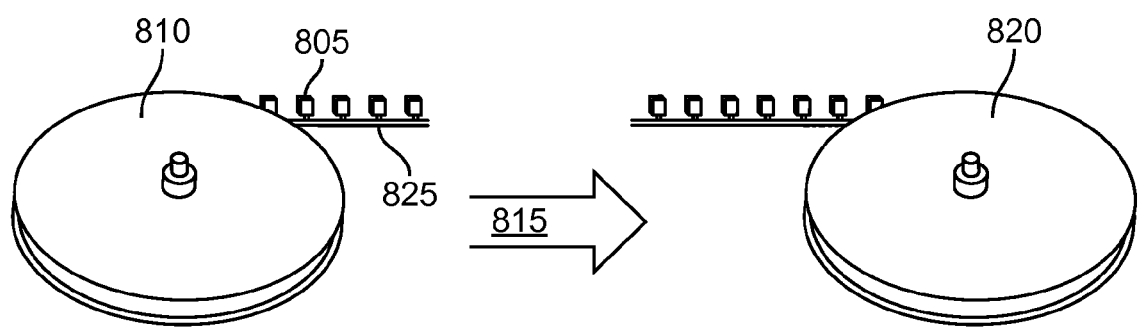
FIG. 8 illustrates a plating operation performed on a shell assembly according to embodiments of the present invention.

The next step after step 120 is step 125. At step 125 of FIG. 1, a plurality of shell assemblies may be plated. For example, a plurality of shell assemblies may be nickel plated. FIG. 8 illustrates a plating operation performed on a shell assembly according to embodiments of the present invention. This plating operation may also be a reel-to-reel operation. For example, shell assemblies 805 may be unreeled from a first reel 810, routed to a plating operation as represented by arrow 815, and then reeled up on a second reel 820. The plating operation may be a nickel plating operation wherein the nickel plating thickness may be a minimum of 2.53 microns.

In some embodiments, the plating process may be a nickel electroplating process using nickel sulfate or an electroless nickel plating process, e.g., high phosphorus electroless nickel. For nickel electroplating, the plating process make include a number of steps such as electrolytic degreasing, rinsing with pure water, activating acid, rinsing with pure water, nickel pre-plating, rinsing with pure water, nickel plating, rinsing with pure water, rinsing with hot pure water, cooking in an oven, and drying on a counter. Alternatively, other standard nickel electroplating processes and electroless nickel plating processes may be used for plating operation 815.

As discussed previously, shell assemblies 805 may be reeled up on reel 820 after plating operation 815 is completed. In order to protect the pluralities of shell assemblies while they are being reeled up on and stored on reel 820, a separating plastic film or guide may be used between the layers of shell assemblies 805. In some embodiments, guide reel 825 may include L-shaped tongs that partially extend away from shell assemblies 805. These tongs may provide a space buffer between the layers of shell assemblies 805 to prevent them from being scratched while being reeled up and stored on reel 820.

Following the polishing operation described above, the plurality of shell assemblies may be fed to another operation station such that the method outlined in FIG. 1 may proceed from step 125 to a next step. An example of a next step is discussed in the next section.

F. Separating

The next step after step 125 is step 130. At step 130 of FIG. 1, a plurality of shell assemblies may be separated. For example, a plurality of shell assemblies may be separated from the guide rail to which they were attached via necks. The stamping operation may be used to sever the guide rail from the assembly connector after all the proceeding steps, steps 110-125, have been completed. The guide rail may be severed at the point where the neck meets the three dimensional rear shell assembly.

In some embodiments, a v-shaped notch may be cut along the length of the neck of the rear shell during step 105a. The v-shaped notch or v-cut on the neck may allow for removal of the assembly connector from the guide rail by hand.

G. Inspection & Packaging

At step 135 of FIG. 1, a plurality of shell assemblies that were severed from the guide rail at step 125 may be inspected and packaged. For example, optical inspection and/or dimensional inspection of shelly assemblies may be used to identify non-compliant shell assemblies. The criteria for complaint shell assemblies may be based on the connector type with which the shell assembly with be used and/or the electronic device with which the shell assemblies may interface. For example, the optical inspection may be used to determine whether the surface the shell assembly is scratched, damaged or has other visual defects. Dimensional analysis may be used to determine whether the shell assemblies are properly sized to be assembled with a plug connector or mated with a corresponding receptacle connector. Non-complaint shell assemblies may be scrapped or have additional operations performed thereon.

The shell assemblies that pass inspection may be packaged in trays having slots for the shell assemblies and the trays may be stacked in boxes. These boxes may then be prepared for shipping or other transportation. In other embodiments, it may be beneficial to bypass step 135 of FIG. 1 and leave shell assemblies attached to a guide rail so that they may be stored on reels for shipping.

H. Additional Operations

In embodiments of the present invention, additional operations may be performed on the shell assemblies between steps 105a, 105b and step 135. These additional operations may also be used instead of some the other operations already described above. For example, cleaning operations may be implemented after the forming steps 105a, 105b to remove oils applied to the rear and front shells during the forming process. To remove these oils one or more of the following steps may be used: ultrasonic degassing, ultrasonic vacuum, and vacuum drying. This cleaning operation may be also performed after the bond operations or at any other time during the method of FIG. 1.

In some embodiments, the operations discussed in the sections above that were performed on the shell assembly may instead be performed on the individual rear and front shells.

In other embodiments, the method of FIG. 1 may including the additional step of assembling a boot or housing over the rear shell of a shell assembly according to embodiments of the present invention and injection molding material in between the rear shell and the housing to affix the housing to the front shell. As discussed in the Summary section above, the housing may be assembled over the rear shell of a shell assembly such that it is flush or nearly flush with surface of the front shell as a result of the rear shell being thinner than the front shell. Accordingly, the housing may be at least as thick as the difference in height or width between the rear shell and the front shell while remaining flush with or slightly taller and wider than the surface of the front shell. This housing thickness allowed for by the smaller sized rear shell may be sufficient to prevent the housing from being prone to cracking or other forms of damage while still being flush or almost flush with the surface of the front shell. Again, this design may be desirable because it is aesthetically pleasing and may allow for smaller connectors.

In some situations, having a housing that is slightly larger than the front shell when assembled with the front shell may be useful. For example, if a strong force is applied to the plug connector while it is being inserted into a corresponding receptacle connector or after the plug connector is inserted into the corresponding receptacle connector of an electronic device, it may penetrate the electronic device beyond what was intended and into the mechanical enclosure of the electronic device. This could result in the motherboard or other components within the electronic device being damaged by the excessive penetration of the plug connector. Accordingly, shell assemblies according to the present invention may assembled with a housing just large enough that there would be enough of a profile between the front shell and the housing that the housing may engage the mechanical enclosure of the device and prevent the shell assembly from penetrating the electronic device to the point of damaging the electronic device while still remaining nearly flush with the shell assembly.

In situations where the front shell and the rear shell of a shell assembly are of the same height and width, a very thin housing may be assembled over the rear shell. However, the housing may be so thin that the housing may be prone to cracking or other forms of damage or the housing may be substantially taller and wider than the assembly shell but no longer flush or nearly flush with the shell assembly. One-piece connector designs are common, e.g., for USB connectors, and generally include front and the rear portions that have the same width and height dimensions. As discussed above, the only way to have a flush or almost flush boot assembled over this kind of one-piece connector would be to overmold a thin boot over the connector. The fallbacks of a reduced thickness boot have already been outlined above. Consequently, the one-piece design generally requires a larger overmold boot and may not result in the slim profile connector discussed above.

II. Other Methods of Manufacture

Figure 9:
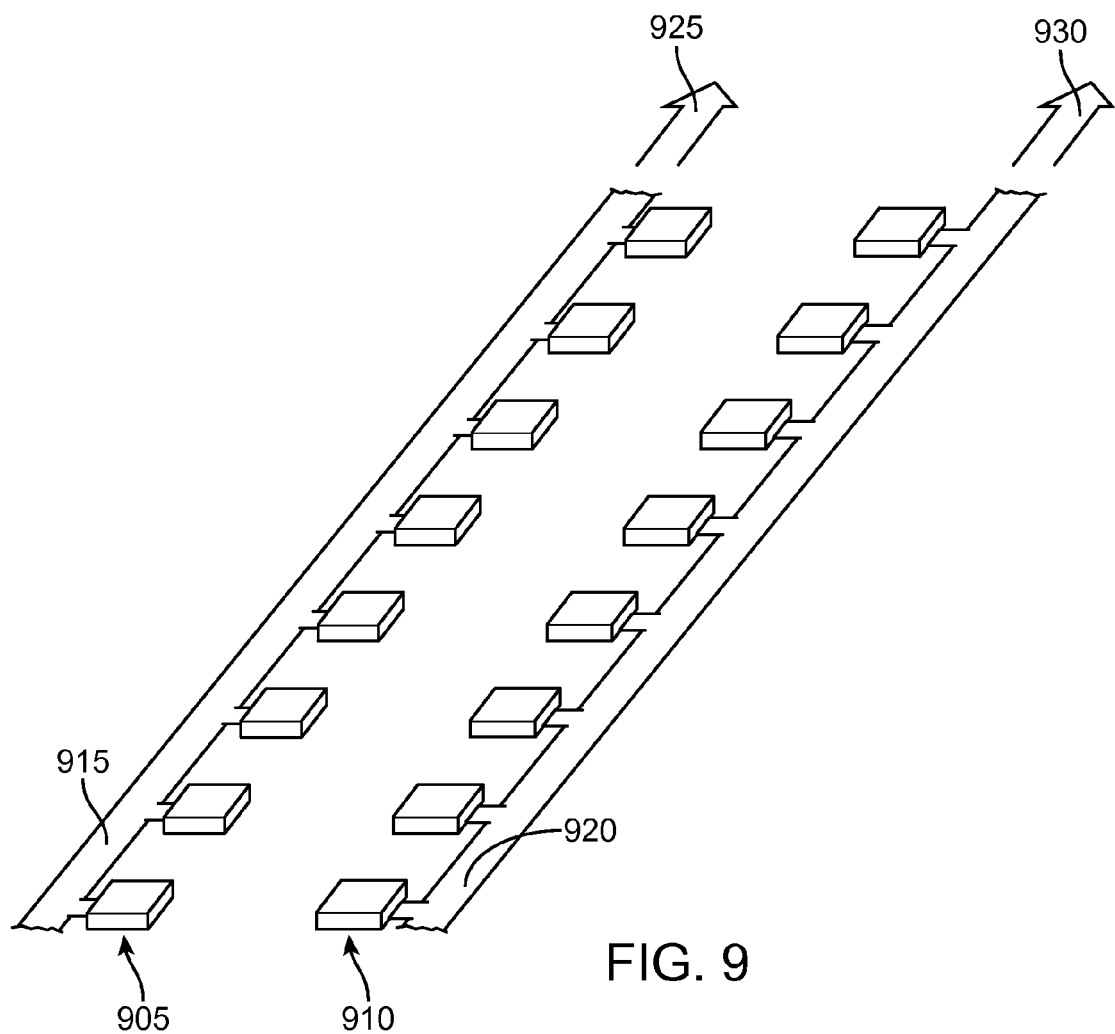
FIG. 9 illustrates an additional method of manufacturing a shell assembly for an electrical connector according to embodiments of the present invention.

FIG. 9 illustrates an additional method of manufacturing a shell assembly for an electrical connector according to embodiments of the present invention. For example, front and rear shell of a shell assembly may both be formed according to step 105A of FIG. 1. As shown in FIG. 9, a plurality rear shells 905 and front shells 910 may both be formed such that their front openings are orthogonal to the length of the guide rails 915 and 920, respectively, as well as feed directions 925 and 930, respectively. In some embodiments, either shell may be severed from its respective guide rails and assembled with the other shell. In other embodiments, the rear shell 905 and front shell 910 may be assembled with each other while each is still attached to their respective guide rails. Additional operations may be performed after the shell assembly is formed and while the front and rear shells are attached to their respective guide or either may be severed from its guide rail before or after performing any of the operations discussed above.

Also, while a number of specific embodiments were disclosed with specific features, a person of skill in the art will recognize instances where the features of one embodiment can be combined with the features of another embodiment. For example, some specific embodiments of the invention set forth above were described as method for forming a plurality of rear and front shell. A person of skill in the art will readily appreciate that the methods described herein may also be used to form rear and front shells one at time and that the methods described above for forming rear shells may be used for forming front shells and vice versa. Also, those skilled in the art will recognize, or be able to ascertain using no more than routine experimentation, many equivalents to the specific embodiments of the inventions described herein. Such equivalents are intended to be encompassed by the following claims

What is claimed is:

1. A method of manufacturing a shell assembly for an electrical connector, the method comprising:
    forming a plurality of first three-dimensional shells along a length of a first metal strip using a progressive stamping process, each of the first shells having a generally rectangular body attached to the first metal strip by a neck and arranged along the first metal strip such that a front end opening of each first shell is orthogonal to the length of the first metal strip;
    forming a plurality of second three-dimensional shells along a length of a second metal strip using a progressive stamping process, each of the second shells having a generally rectangular body attached to the second metal strip and arranged along the second metal strip such that front and rear openings of each second shell are parallel to a length of the second metal strip;
    attaching a second shell of the plurality of second shells to each shell of the plurality of first shells by: (i) severing the second shell from the second metal strip, (ii) sliding the rear opening of the second shell over the front end opening of the first shell so that a portion of the second shell overlaps the first shell and (iii) bonding the first and second shells together in the overlapping region to form a shell assembly; and
    for each shell assembly, performing additional operations on the shell assembly while the first shell is attached to the first metal strip by the neck.

2. The method of manufacturing a shell for an electrical connector set forth in claim 1 wherein the additional operations performed on each shell assembly while attached to the first metal strip by the neck comprise:
    a sandblasting operation; and
    a plating operation.

3. The method of manufacturing a shell assembly for an electrical connector set forth in claim 1 further comprising, for each shell assembly, severing the neck of the first shell to separate the shell assembly from the first metal strip after the additional operations are performed.

4. The method of manufacturing a shell assembly for an electrical connector set forth in claim 1 further comprising, for each first shell in the plurality of first shells, compressing the first shell around each of four sides of the front opening while sliding the rear opening of the second shell over the first shell.

5. The method of manufacturing a shell assembly for an electrical connector set forth in claim 1 wherein the progressive stamping operations for each of the first and second metal strips comprises shearing holes and shapes in the first and second metal strips and bending portions of the first and second metal strips to form the plurality of first and second three dimensional shells.

6. The method of manufacturing a shell assembly for an electrical connector set forth in claim 1 wherein the attaching step comprises feeding the first plurality of shells into a tool along a first feed direction and feeding the second plurality of shells into the tool along a second feed direction, perpendicular to the first feed direction.

7. The method of manufacturing a shell assembly for an electrical connector set forth in claim 1 wherein each of the first and second shells are bonded together in the overlapping region using a laser welding process.

8. The method of manufacturing a shell assembly for an electrical connector set forth in claim 1 wherein:
    for the first metal strip, after the progressive stamping process, each of the first shells is attached to a single guide rail of the first metal strip by the neck; and
    for the second metal strip, after the progressive stamping process, each of the second shells is positioned between first and second parallel guide rails of the second metal strip and is attached to the second metal strip by a neck that is attached to a support rail that extends perpendicularly between the first and second parallel guide rails.

9. A method of manufacturing a shell assembly for an electrical connector, the shell assembly including a first and second shell, the method comprising:
    feeding a length of metal strip in a first direction to a stamping line;
    stamping, in a second direction, the metal strip, the second direction being orthogonal to the first direction, the stamping comprising:
        shearing holes and shapes in the metal strip to define a first section of material to act as a carrier strip including one or more sheared holes, a second section of material for forming the first shell, and a neck connecting the first and second sections of material; and forming the first shell with a mechanical press and forming cam, the first shell comprising:

a height, a length and a width; and a first opening defining a cavity about the length of the first shell, the first opening being orthogonal to the first direction;

assembling the first shell with the second shell, the second shell having an opening defining a cavity that has a width and a thickness that are greater than the width and thickness of the first shell, respectively, the opening of the second shell being assembled over the first shell to form a shell assembly; and performing additional operations on the shell assembly while the shell assembly remains attached to the carrier strip via the neck.

10. The method of claim 9, wherein the first shell is a rear shell of the shell assembly and the second shell is a front shell of the shell assembly.

11. The method of claim 9, wherein the first shell is a front shell of the shell assembly and the second shell is the rear shell of the shell assembly.

12. The method of claim 9, wherein the additional operations include welding, sandblasting and plating the assembled plug connector.

13. The method of claim 12, wherein the additional operations are performed via the carrier strip being routed via a reel to an operation station for performing the one or more additional operations.

14. The method of claim 9, further comprising winding the carrier strip around a reel, the carrier strip still having the assembled plug connector attached thereto, for storing or routing one or more assembled plug connectors.

15. The method of claim 9, wherein the first shell includes one or more locking tabs and the second shell includes corresponding locking gaps, wherein the locking tabs extend into the locking holes when the second shell is assembled over the first shell and the locking tabs are positioned directly below the locking holes thereby holding the first and second shells in their assembled positions with respect to each.

16. The method of claim 9, further comprising removing the shell assembly from the carrier strip.

17. The method of claim 16, further comprising assembling a rear boot with the plug connector.

18. The method of claim 17, further comprising affixing the rear boot assembled with the plug connector to the shell assembly by injection molding material between the rear boot and the shell assembly.

19. The method of claim 18, wherein the rear boot includes a data and power transmission cable attached to an end thereof.

20. A method of manufacturing a shell assembly for an electrical connector, the method comprising:

forming a plurality of first three-dimensional shells along a length of a first metal strip using a progressive stamping process, each of the first shells having a generally rectangular body attached to the first metal strip by a neck and arranged along the first metal strip such that a front end opening of each first shell is orthogonal to the length of the first metal strip;

forming a plurality of second three-dimensional shells along a length of a second metal strip using a progressive stamping process, each of the second shells having a generally rectangular body attached to the second metal strip and arranged along the second metal strip such that a front end opening of each second shell is orthogonal to a length of the second metal strip;

for each first shell in the plurality of first shells, attaching a second shell to first shell by: (i) severing the second shell from the second metal strip, (ii) sliding the rear opening of the second shell over the front end opening of the first shell so that a portion of the second shell overlaps the first shell and (iii) bonding the first and second shells together in the overlapping region to form a shell assembly; and for each shell assembly, performing additional operations on the shell assembly while the first shell is attached to the first metal strip by the neck.

21. The method of claim 20, wherein the second shell is not severed from the second metal strip as part of attaching the second shell to the first shell.

22. The method of claim 21, wherein the second shell is severed from the second metal strip after attaching the second shell to the first shell.

* * * * *